United States Patent
Wu et al.

(10) Patent No.: US 9,454,057 B2
(45) Date of Patent: Sep. 27, 2016

(54) ELECTROPHORETIC DISPLAY AND STRUCTURE THEREOF FOR REDUCING COUPLING EFFECT THEREIN

(71) Applicant: SiPix Technology Inc., Taoyuan County (TW)

(72) Inventors: Yan-Liang Wu, Kaohsiung (TW); Chi-Mao Hung, Hsinchu (TW); Wei-Min Sun, Taipei (TW); Pei-Lin Tien, Taichung (TW); Chih-Yuan Hsu, Taipei (TW)

(73) Assignee: SiPix Technology Inc., Taoyuan (TW)

( * ) Notice: Subject to any disclaimer, the term of this patent is extended or adjusted under 35 U.S.C. 154(b) by 126 days.

(21) Appl. No.: 13/651,480

(22) Filed: Oct. 15, 2012

(65) Prior Publication Data

US 2013/0250397 A1 Sep. 26, 2013

(30) Foreign Application Priority Data

Mar. 26, 2012 (TW) .............................. 101110359 A (51) Int. Cl.
*G02B 26/00* (2006.01)
*G02F 1/167* (2006.01)
*G09G 3/34* (2006.01)

(52) U.S. Cl.
CPC .............. *G02F 1/167* (2013.01); *G09G 3/344* (2013.01); *G09G 2320/0219* (2013.01)

(58) Field of Classification Search
CPC .............. G02F 1/167; G02F 1/13306; G02F 2001/1678; G02F 2001/1672; G02F 2001/1676
USPC ........ 359/237–240, 242, 245–246, 250–252, 359/265–271, 290–298, 346–384, 359/245–245; 429/209, 246; 345/87–88, 345/95–96; 349/37
See application file for complete search history.

(56) References Cited

U.S. PATENT DOCUMENTS 4,045,327 A 8/1977 Noma et al.
7,920,110 B2 * 4/2011 Chiou .............................. 345/82
(Continued)

FOREIGN PATENT DOCUMENTS

JP 54-155795 12/1979
JP 59-160939 9/1984
(Continued)

OTHER PUBLICATIONS

"Office Action of Taiwan Counterpart Application", issued on Oct. 23, 2014, p. 1-7, in which the listed references were cited.

*Primary Examiner* — Bumsuk Won
*Assistant Examiner* — Tamara Y Washington
(74) *Attorney, Agent, or Firm* — Jianq Chyun IP Office (57) ABSTRACT

An electrophoretic display (EPD) including a plurality of first electrodes, a plurality of second electrodes, and a plurality of pixel units is provided. The first electrodes are arranged in parallel and configured to receive a plurality of first electrode driving signals. The second electrodes are arranged in parallel and disposed perpendicular to the first electrodes, and the second electrodes are configured to receive a plurality of second electrode scanning signals. The pixel units are respectively arranged between the first electrodes and the second electrodes as an array. Each pixel unit includes a first capacitor and a second capacitor. The first terminal of the first capacitor is coupled to the corresponding first electrode. The first terminal of the second capacitor is coupled to the second terminal of the first capacitor, and the second terminal of the second capacitor is coupled to the corresponding second electrode.

5 Claims, 5 Drawing Sheets (56) References Cited

U.S. PATENT DOCUMENTS

| | | | |
|---|---|---|---|
| 8,085,233 B2 * | 12/2011 | Lu et al. ........................ | 345/98 |
| 2011/0285610 A1 * | 11/2011 | Yan et al. ....................... | 345/55 |
| 2013/0033476 A1 * | 2/2013 | Dean ..................... | G09G 3/344 |
| | | | 345/211 |

FOREIGN PATENT DOCUMENTS

| | | |
|---|---|---|
| JP | 63-027143 | 2/1988 |
| JP | 03-015027 | 1/1991 |
| JP | 2008-209524 | 9/2008 |
| TW | 594974 | 6/2004 |

* cited by examiner

ELECTROPHORETIC DISPLAY AND STRUCTURE THEREOF FOR REDUCING COUPLING EFFECT THEREIN

CROSS-REFERENCE TO RELATED APPLICATION

This application claims the priority benefit of Taiwan application serial no. 101110359, filed on Mar. 26, 2012. The entirety of the above-mentioned patent application is hereby incorporated by reference herein and made a part of this specification.

BACKGROUND OF THE INVENTION

1. Field of the Invention

The invention generally relates to an electrophoretic display (EPD), and more particularly, to an EPD in which the passive matrix coupling effect is avoided by serially connecting capacitors of small capacitances.

2. Description of Related Art

In recent years, electrophoretic display (EPD) has been broadly applied in the production of electronic paper. Compared to displays with backlights (for example, liquid crystal display (LCD)), electronic paper offers a more paper-like visual sensation and accordingly a more comfortable reading experience to its users. Thus, electronic paper is broadly applied in the panel structure of electronic book. Besides, EPD consumes electricity only when the displayed content is changed. Thus, EPD consumes less power than other conventional displays.

If the passive matrix pixel position control technique is adopted in an EPD, when a specific pixel unit is controlled, the driving voltage supplied to the specific pixel unit also affects other pixel units in the circuit. To be specific, when the specific pixel unit is controlled, the driving voltage supplied to this specific pixel unit charges/discharges the capacitors corresponding to other pixel units. The charge/discharge operations result in a residue voltage on the capacitors corresponding to the other pixel units, and the residue voltage usually brings a coupling effect and accordingly reduces the performance of the EPD. For example, the ghost or cross talk phenomenon may be produced at frame refreshing.

SUMMARY OF THE INVENTION

Accordingly, the invention is directed to an electrophoretic display (EPD) in which the ghost or cross talk phenomenon caused by capacitive coupling effect is avoided and accordingly the performance of the EPD is improved.

The invention is also directed to an EPD structure in which the ghost or cross talk phenomenon caused by capacitive coupling effect is avoided and accordingly the performance of the EPD is improved.

The invention provides an EPD including a plurality of first electrodes, a plurality of second electrodes, and a plurality of pixel units. The first electrodes are arranged in parallel and configured to receive a plurality of first electrode driving signals. The second electrodes are arranged in parallel and perpendicular to the first electrodes, and the second electrodes are configured to receive a plurality of second electrode scanning signals. The pixel units are respectively arranged between the first electrodes and the second electrodes as an array. Each of the pixel units includes a first capacitor and a second capacitor. A first terminal of the first capacitor is coupled to the first electrode corresponding to the pixel unit. A first terminal of the second capacitor is coupled to a second terminal of the first capacitor, and a second terminal of the second capacitor is coupled to the second electrode corresponding to the pixel unit.

According to an embodiment of the invention, the capacitance of the first capacitor is smaller than the capacitance of the second capacitor.

According to an embodiment of the invention, a ratio of the capacitance of the first capacitor to the capacitance of the second capacitor is between 1:1 and 1:10.

According to an embodiment of the invention, during a time period, one of the first electrode driving signals is equal to a reference driving voltage, and the rest first electrode driving signals present a high-impedance state.

According to an embodiment of the invention, during the time period, one of the second electrode scanning signals is equal to a scanning voltage, and the rest second electrode scanning signals present a high-impedance state.

The invention also provides an EPD structure including a plurality of first electrodes, a dielectric layer, a plurality of conductive blocks, a fluid medium layer, and a plurality of second electrodes. The first electrodes are arranged in parallel. The dielectric layer covers the first electrodes. The conductive blocks are arranged on the dielectric layer as an array. The fluid medium layer covers the conductive blocks. The second electrodes are arranged in parallel and perpendicular to the first electrodes. The conductive blocks are disposed at projected overlaps between the first electrodes and the second electrodes.

According to an embodiment of the invention, a plurality of first capacitors is respectively formed between the first electrodes and the conductive blocks.

According to an embodiment of the invention, a plurality of second capacitors is respectively formed between the second electrodes and the conductive blocks.

As described above, in the invention, the first capacitors are serially connected or formed between the second capacitors and the corresponding first electrodes, so that the first capacitors can share a portion of the residue voltage that originally resides on the second capacitors of the pixel units other than a specific controlled pixel unit. Thereby, the capacitive coupling effect is avoided and the performance of the EPD is improved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
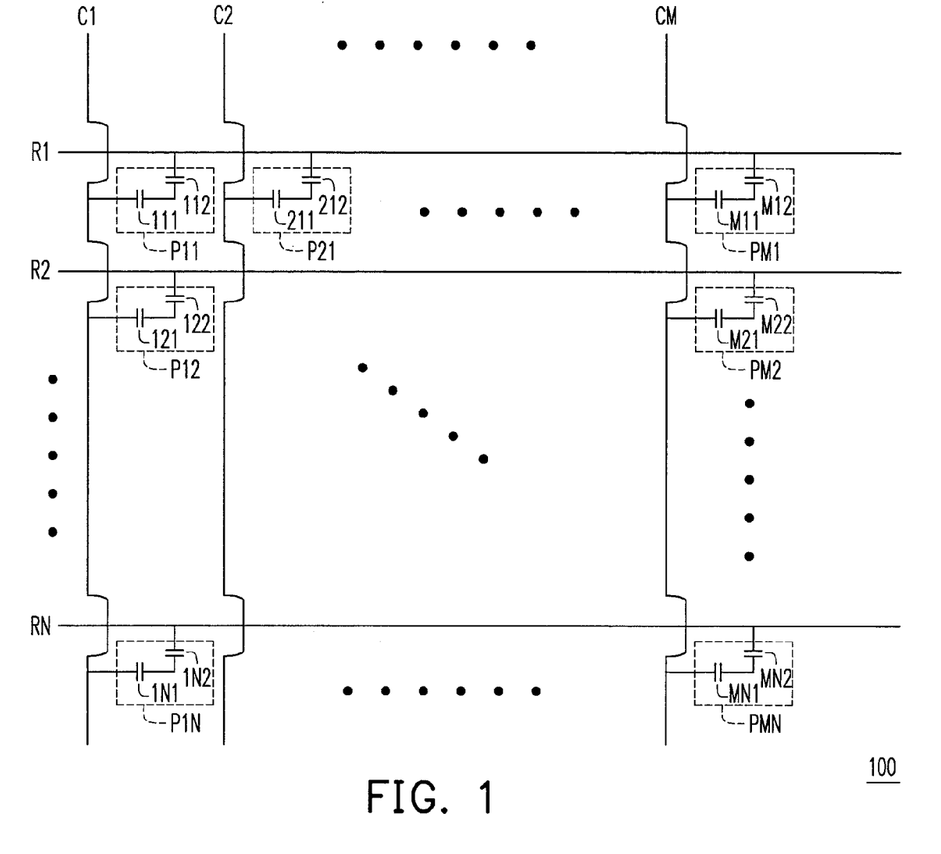
FIG. 1 is a diagram of an electrophoretic display (EPD) 100 according to an embodiment of the invention.

FIG. 1 is a diagram of an electrophoretic display (EPD) 100 according to an embodiment of the invention. Referring to FIG. 1, the EPD 100 includes first electrodes C1-CM (M is a positive integer), second electrodes R1-RN (N is a positive integer), and pixel units P11-PMN. The first electrodes C1-CM are arranged in parallel and configured to respectively receive a plurality of first electrode driving signals. The second electrodes R1-RN are arranged in parallel and perpendicular to the first electrodes C1-CM. The second electrodes R1-RN are configured to receive a plurality of second electrode scanning signals. The pixel units P11-PMN are arranged between the first electrodes C1-CM and the second electrodes R1-RN as an array. For example, the pixel unit P11 is arranged between the first electrode C1 and the second electrode R1, the pixel unit P12 is arranged between the first electrode C1 and the second electrode R2, the pixel unit PMN is arranged between the first electrode CM and the second electrode RN, and so on.

In the present embodiment, each of the pixel units P11-PMN includes two capacitors. Taking the pixel unit P11 as an example, the pixel unit P11 includes a first capacitor 111 and a second capacitor 112. The first terminal of the first capacitor 111 is coupled to the first electrode C1 corresponding to the pixel unit P11, and the second terminal of the first capacitor 111 is coupled to the first terminal of the second capacitor 112. Besides, the second terminal of the second capacitor 112 is coupled to the second electrode R1 corresponding to the pixel unit P11. The pixel unit P12 includes a first capacitor 121 and a second capacitor 122. The first terminal of the first capacitor 121 is coupled to the first electrode C1, and the first terminal of the second capacitor 122 is coupled to the second terminal of the first capacitor 121. Besides, the second terminal of the second capacitor 122 is coupled to the second electrode R2 corresponding to the pixel unit P12. The coupling relationship of the first capacitors and the second capacitors in the other pixel units can be understood based on foregoing description.

In the present embodiment, the display mode of each of the pixel units P11-PMN is controlled by the voltage difference between the first electrode driving signal supplied to the corresponding one of the first electrodes C1-CM and the second electrode scanning signal supplied to the corresponding one of the second electrodes R1-RN.

For example, a plurality of particles carrying positive charges (for example, in black color) and a plurality of particles carrying negative charges (for example, in white color) are respectively distributed in the pixel units P11-PMN for presenting the displayed content of the EPD 100. How the EPD 100 controls the display modes of the pixel units P11-PMN will be explained herein by taking the pixel unit P11 as an example. First, by supplying a first electrode driving signal to the first electrode C1 and a second electrode scanning signal to the second electrode R1, the first capacitor 111 and the second capacitor 112 in the pixel unit P11 and accordingly the relative position between the black particles carrying positive charges and the white particles carrying negative charges in the pixel unit P11 are controlled, so as to adjust the color and/or grayscale value presented by the pixel unit P11. It should be noted that in each of the pixel units P11-PMN, the portion for rendering color is related to the second capacitor. Herein the second capacitor is formed of the fluid medium layer in the EPD 100. Namely, the color rendering particles exist in the fluid medium layer belonging to the second capacitor, and the corresponding first capacitor has nothing to do with the display mode of the EPD 100.

It should be noted that in the EPD 100 of the present embodiment, two capacitors are serially connected between the first electrode and second electrode corresponding to each of the pixel units P11-PMN. Taking the pixel unit P11 as an example, the first capacitor 111 and the second capacitor 112 are serially connected between the first electrode C1 and the second electrode R1 corresponding to the pixel unit P11, and the ratio of the capacitance of the first capacitor 111 to the capacitance of the second capacitor 112 is between 1:1 and 1:10. As long as the difference between the capacitance of the first capacitor and the capacitance of the second capacitor reaches a certain degree, the ghost or cross talk phenomenon caused by the capacitive coupling effect between pixel units can be effectively avoided by dividing the voltage between the first electrode and the second electrode through the first capacitor and the second capacitor and redirecting a portion or most of the residue voltage on the uncontrolled pixel units that may cause the ghost or cross talk phenomenon onto the first capacitor which is not related to the display task. This will be explained in detail below.

Below, how should the ratio of the capacitance of the first capacitor 111 to the capacitance of the second capacitor 112 be set will be explained in detail with reference to an embodiment of the invention, so that those having ordinary knowledge in the art can well understand the advantages of the invention.

Figure 2A:
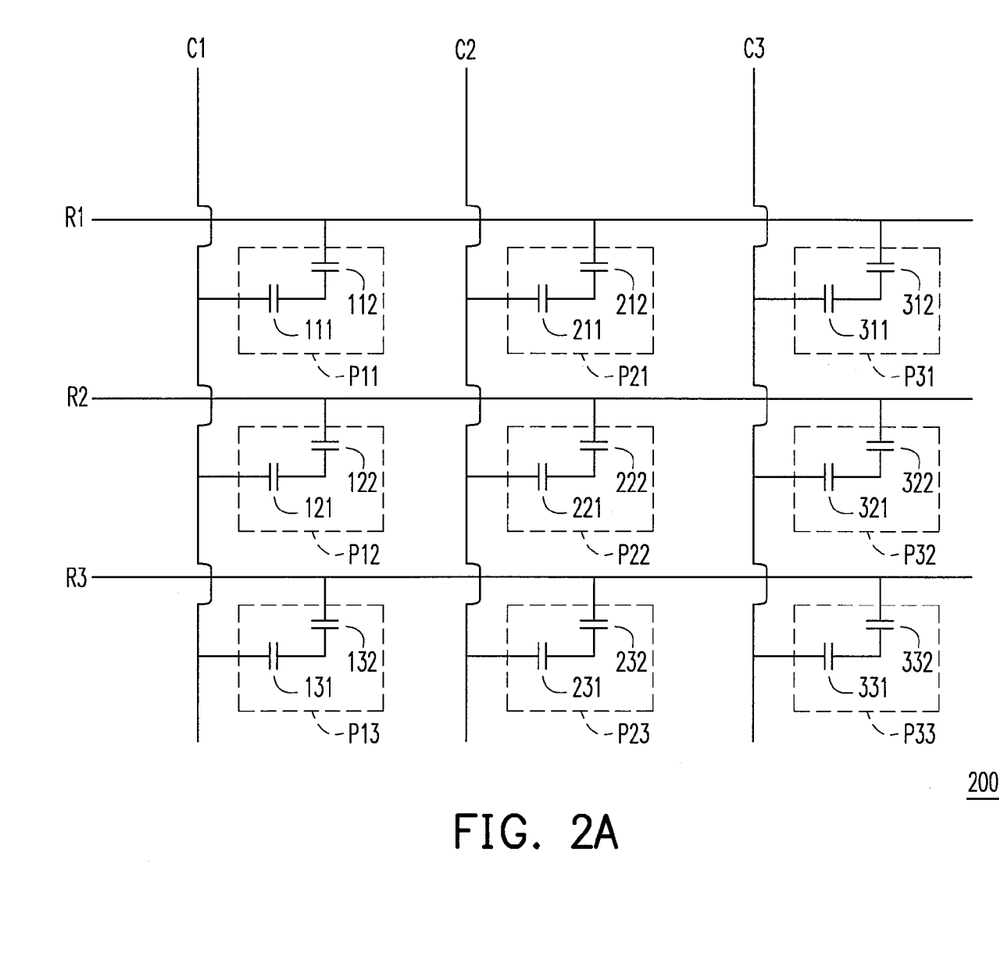
FIG. 2A illustrates an implementation of an EPD 200 according to an embodiment of the invention.

FIG. 2A illustrates an implementation of an EPD 200 according to an embodiment of the invention. In the present implementation, the EPD 200 is a display panel having a 3×3 pixel unit array (i.e., in the EPD 100 illustrated in FIG. 1, M and N are both 3). For example, when only the pixel unit P12 is to be controlled, during a time period, a first electrode driving signal equal to a reference driving voltage (for example, 15V) and a second electrode scanning signal equal to a scanning voltage (for example, 0V) are respectively supplied to the first electrode C1 and the second electrode R2, and the first electrodes C2 and C3 and the second electrodes R1 and R3 are kept in a high-impedance state. Meanwhile, the voltage difference between the first electrode C1 and the second electrode R2 charges/discharges the first capacitor 121 and the second capacitor 122 and moves the conductive particles in the pixel unit P12, so that the color and/or grayscale value presented by the pixel unit P12 is changed.

The voltage difference (for example, 15−0V=15V) between the reference driving voltage supplied to the first electrode and the scanning voltage supplied to the second electrode is divided on the first capacitor 121 and the second capacitor 122 based on the capacitances of the first capacitor 121 and the second capacitor 122. Thus, the voltage difference has to be set to a value sufficient for driving the second capacitor 122 that renders the color of the pixel unit P12 even after a portion of the voltage difference is redirected by the first capacitor 121.

Figure 2B:
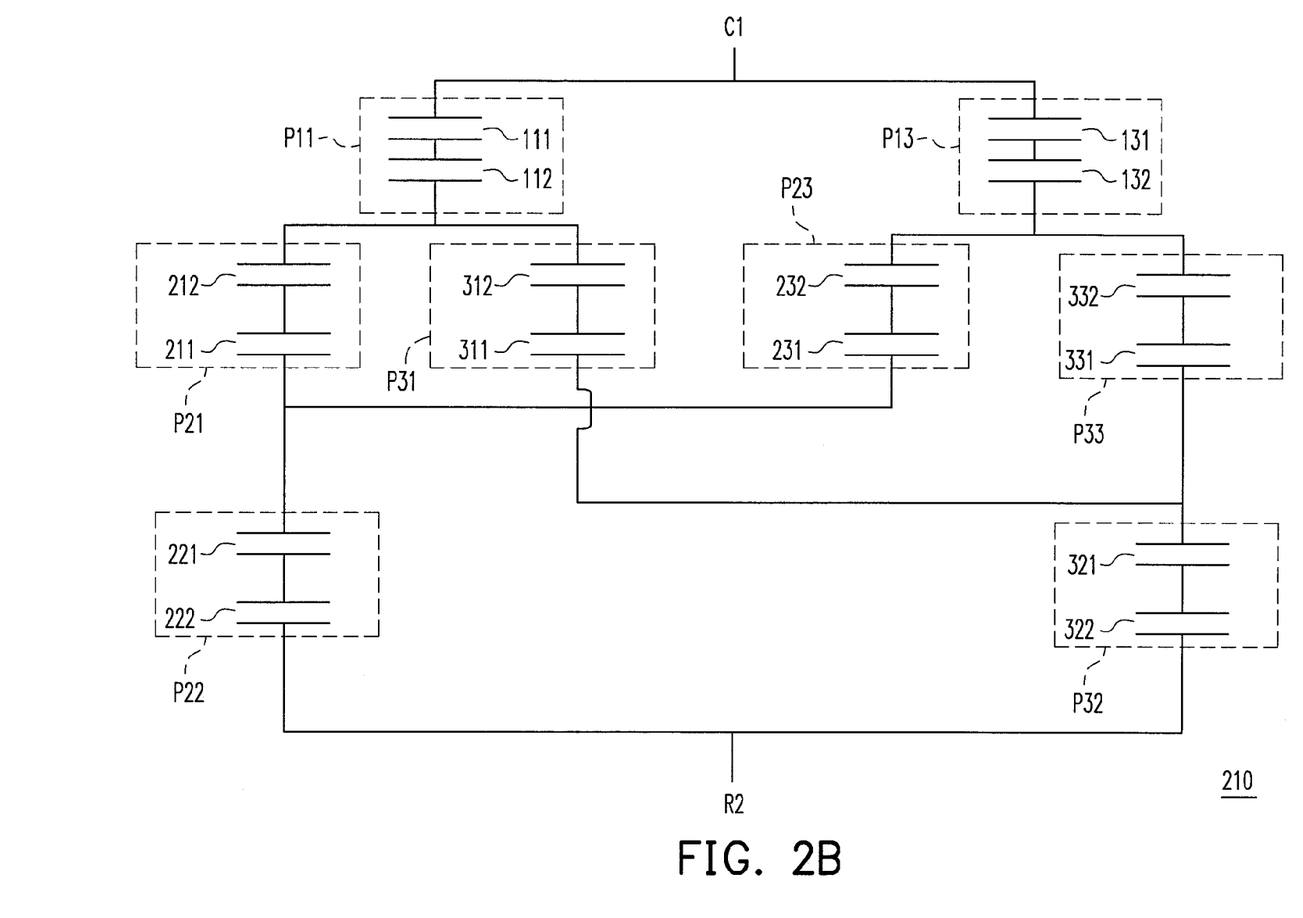
FIG. 2B is an equivalent circuit diagram of the EPD 200 according to an embodiment of the invention.

In the present embodiment, at the same time of controlling the pixel unit P12 through the voltage levels of the first electrode C1 and the second electrode R2, the first capacitors and second capacitors of the uncontrolled pixel units P11 and P13-P33 also receive the voltage difference supplied to the first electrode C1 and the second electrode R2 due to the coupling effect. FIG. 2B is an equivalent circuit diagram of the EPD 200 according to an embodiment of the invention. The equivalent circuit 210 of the EPD 200 in FIG. 2B is illustrated regarding the uncontrolled pixel units P11 and P13-P33 by assuming that a first electrode driving signal equal to a reference driving voltage (for example, 15V) and a second electrode scanning signal equal to a scanning voltage (for example, 0V) are respectively supplied to the first electrode C1 and the second electrode R2 and the first electrodes C2 and C3 and the second electrodes R1 and R3 are kept in the high-impedance state.

It can be well understood by referring to FIG. 2B that the voltage difference supplied to the first electrode C1 and the second electrode R2 is distributed among the pixel units P11 and P13-P33 due to the coupling effect. Besides, through the voltage division effect of the first capacitors disposed in the pixel units P11 and P13-P33 on the voltage difference supplied to the first electrode and the second electrode, the voltage difference supplied to the second capacitors of the pixel units P11 and P13-P33 is effectively reduced, and the movement of the conductive particles in the pixel units P11 and P13-P33 is decreased or even stopped. Accordingly, the impact made by the voltage difference supplied to the first electrode C1 and the second electrode R2 on the display state of the pixel units P11 and P13-P33 is greatly reduced or even eliminated. Thereby, the ghost or cross talk phenomenon caused by the capacitive coupling effect between the pixel units is effectively avoided and the display quality of the EPD 200 is improved.

Figure 3A:
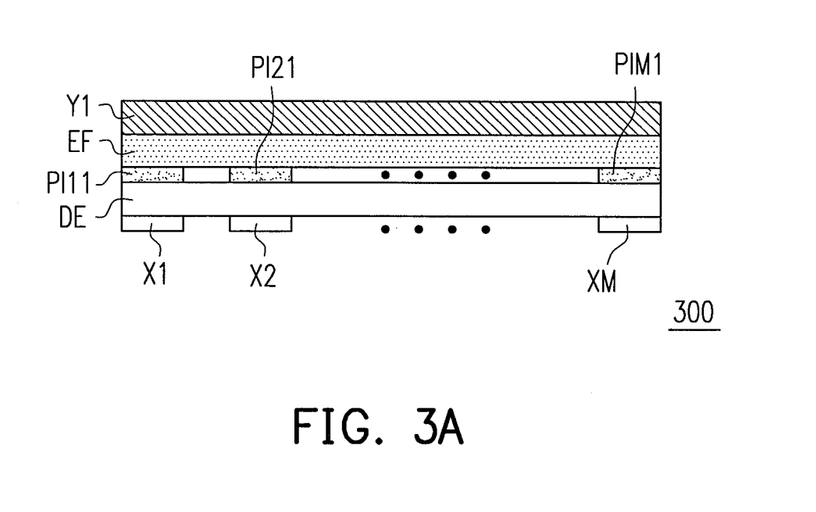
FIG. 3A, FIG. 3B, and FIG. 3C are diagrams of an EPD structure 300 according to an embodiment of the invention.
Figure 3B:
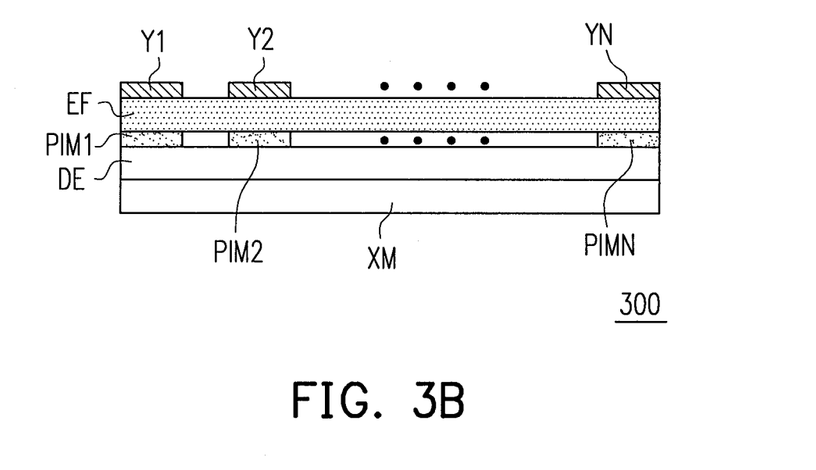
Figure 3C:
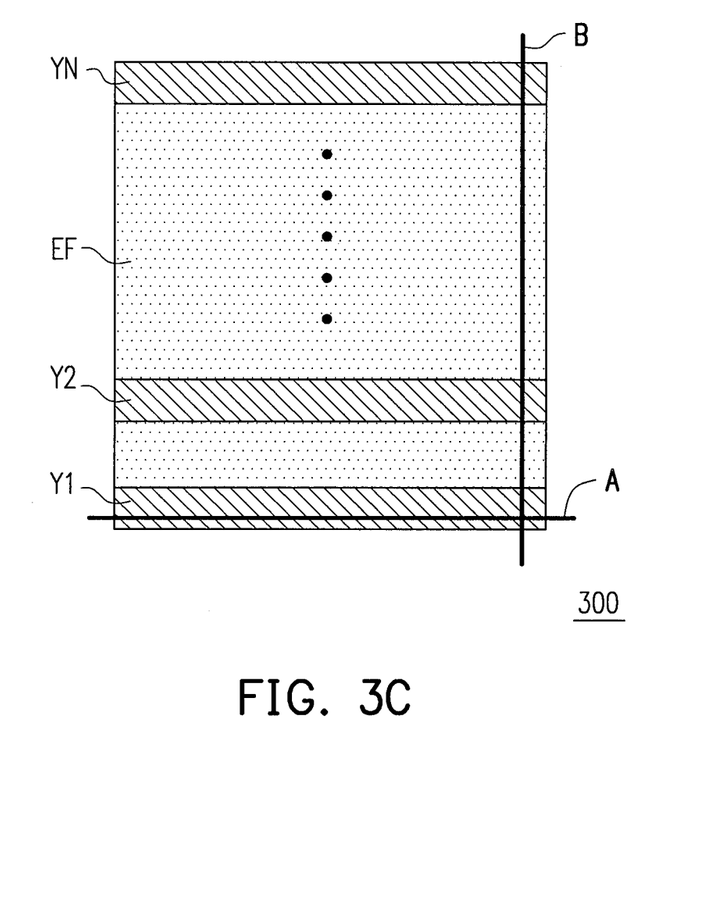

FIG. 3A, FIG. 3B, and FIG. 3C are diagrams of an EPD structure 300 according to an embodiment of the invention. FIG. 3C is a top view of the EPD structure 300, FIG. 3A is a cross-sectional view of the EPD structure 300 in FIG. 3C along line A, and FIG. 3B is a cross-sectional view of the EPD structure 300 in FIG. 3C along line B. The EPD structure 300 includes first electrodes X1-XM, a dielectric layer DE, conductive blocks PI11-PIMN, a fluid medium layer EF, and second electrodes Y1-YN. The first electrodes X1-XM are arranged in parallel. The dielectric layer DE covers the first electrodes X1-XM. The conductive blocks PI11-PIMN are arranged on the dielectric layer DE as an array. The fluid medium layer EF covers the conductive blocks PI11-PIMN. The second electrodes Y1-YN are also arranged in parallel and cover a portion of the fluid medium layer EF, and the second electrodes Y1-YN are disposed perpendicular to the first electrodes X1-XM. The conductive blocks PI11-PIMN are disposed at the projected overlaps between the first electrodes X1-XM and the second electrodes Y1-YN. For example, the conductive block PI11 is disposed at the projected overlap between the first electrode X1 and the second electrode Y1, and the conductive block PIMN is disposed at the projected overlap between the first electrode XM and the second electrode YN. The arrangement of the other pixel units can be understood based on foregoing description.

First capacitors 111-MN1 are respectively formed between the first electrodes X1-XM and the conductive blocks PI11-PIMN, and second capacitors 112-MN2 are respectively formed between the second electrodes Y1-YN and the conductive blocks PI11-PIMN. Taking the conductive block PI11 as an example, the first capacitor 111 is formed between the first electrode X1 and the conductive block PI11, and the second capacitor 112 is formed between the second electrode Y1 and the conductive block PI11. Taking the conductive block PIMN as an example, the first capacitor MN1 is formed between the first electrode XM and the conductive block PIMN, and the second capacitor MN2 is formed between the second electrode YN and the conductive block PIMN. How the first capacitors and the second capacitors between the rest conductive blocks and the corresponding first electrodes and second electrodes are formed can be understood according to foregoing description. In addition, the ratio of the capacitance of each first capacitor to the capacitance of each second capacitor is set between 1:1 and 1:10.

Please note that each first capacitor is formed between one of the first electrodes X1-XM and the corresponding one of the conductive blocks PI11-PIMN by taking the dielectric layer DE as its capacitive medium, and each second capacitor is formed between one of the second electrodes Y1-YN and the corresponding one of the conductive blocks PI11-PIMN by taking the fluid medium layer EF as its capacitive medium. The display state o the EPD structure 300 is related to the moving state of conductive particles in the fluid medium layer EF generated due to the voltage difference supplied to the fluid medium layer EF but not related to the dielectric layer DE.

As described above, the invention provides an EPD and a structure thereof, in which by serially connecting or forming the first capacitors between the second capacitors in the pixel units and the corresponding first electrodes, the original residue voltage on the second capacitors of other pixel units produced by controlling a specific pixel unit is redirected by the first capacitors, so that the capacitive coupling effect on the display-related second capacitors is eliminated and accordingly the performance of the EPD is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electrophoretic display (EPD), comprising:
   a plurality of first electrodes, arranged in parallel, and configured to receive a plurality of first electrode driving signals;
   a plurality of second electrodes, arranged in parallel and perpendicular to the first electrodes, and configured to receive a plurality of second electrode scanning signals; and
   a plurality of pixel units, respectively arranged between the first electrodes and the second electrodes to an array, wherein each of the pixel units comprises:
      a first capacitor, having a first terminal and a second terminal, wherein the first terminal is coupled to the first electrode corresponding to each of the pixel units; and
      a second capacitor, having a first terminal and a second terminal, wherein the first terminal of the second capacitor is only direct electrically connected to the second terminal of the first capacitor, and the second terminal of the second capacitor is coupled to the second electrode corresponding to each of the pixel units, wherein the first terminal of the first capacitor and the second terminal of the second capacitor are separate terminals,
      wherein the first capacitor and the second capacitor are coupled in series, a capacitance of the first capacitor is smaller than a capacitance of the second capacitor, and the second capacitor is formed of a fluid medium layer in the EPD.

2. The EPD according to claim 1, wherein a ratio of a capacitance of the first capacitor to a capacitance of the second capacitor is between 1:1 and 1:10.

3. The EPD according to claim 1, wherein during a time period, at least one of the first electrode driving signals is equal to a reference driving voltage, and the rest first electrode driving signals present a high-impedance state.

4. The EPD according to claim 3, wherein during the time period, at least one of the second electrode scanning signals is equal to a scanning voltage, and the rest second electrode scanning signals present a high-impedance state.

5. The EPD according to claim 1, wherein color rendering particles exist in the fluid medium layer belong to the second capacitor.

\* \* \* \* \*